United States Patent [19]

Guergov

[11] Patent Number: 5,716,561
[45] Date of Patent: *Feb. 10, 1998

[54] INJECTION CONTROL SYSTEM

[76] Inventor: Milko G. Guergov, 615 Washington, #5, Monroe, Mich. 48161

[*] Notice: The term of this patent shall not extend beyond the expiration date of Pat. No. 5,662,841.

[21] Appl. No.: 654,622

[22] Filed: May 29, 1996

Related U.S. Application Data

[63] Continuation-in-part of Ser. No. 515,522, Aug. 15, 1995, Pat. No. 5,662,841, which is a continuation of Ser. No. 236,471, May 2, 1994, Pat. No. 5,441,680.

[51] Int. Cl.⁶ .................................. B29C 45/34
[52] U.S. Cl. .................. 264/40.1; 264/40.3; 264/51; 264/85; 264/572; 264/328.1; 264/328.13; 425/4 R; 425/146; 425/546
[58] Field of Search .................... 264/40.1, 40.3, 264/51, 85, 500, 572, 328.1, 328.13, DIG. 13; 425/4 R, 145, 146, 149, 546

[56] References Cited

U.S. PATENT DOCUMENTS

| | | |
|---|---|---|
| 3,044,118 | 7/1962 | Bernhardt et al. |
| 3,532,154 | 10/1970 | Balevski . |
| 3,632,703 | 1/1972 | Sullivan et al. |
| 3,694,529 | 9/1972 | Josephsen et al. |
| 3,819,313 | 6/1974 | Josephsen et al. |
| 3,893,792 | 7/1975 | Laczko . |
| 3,960,996 | 6/1976 | Balevski et al. |
| 3,988,403 | 10/1976 | Angell, Jr. et al. |
| 4,092,385 | 5/1978 | Balevski et al. |
| 4,101,617 | 7/1978 | Friederich . |
| 4,153,231 | 5/1979 | Hayakawa et al. ........ 249/82 |

(List continued on next page.)

FOREIGN PATENT DOCUMENTS

| | | |
|---|---|---|
| 43889 | 1/1991 | Bulgaria . |
| 3505554 | 2/1985 | Germany . |
| 448066 | 4/1975 | U.S.S.R. . |
| 463513 | 4/1975 | U.S.S.R. . |
| 482243 | 2/1976 | U.S.S.R. . |

(List continued on next page.)

OTHER PUBLICATIONS

"New Advancements in Countrpressure Structural Foam Processing", Michael Caropreso *Typical Clamp Requirements*, pp. 79–81, 1984.
"How the TM–Process Works", date unknown.
"The Helga Process", Dr. Siebolt Hettinga, date unknown.
"TM–Process: Counter Pressure Injection Moulding Of Structural Foam Parts" Brochure, Metal Technology Research & Production Corporation, date unknown.
"The Airmould Process–A Pressure Controlled Gas–assisted Injection Molding Process", Dipl.–Ing. Helmut Eckhardt, date unknown.

(List continued on next page.)

*Primary Examiner*—Jill L. Heitbrink
*Attorney, Agent, or Firm*—Brooks & Kushman P.C.

[57] ABSTRACT

A method of injection molding for use with an injection molding machine (10) includes: (a) generating pressurized gas and pressurized moisture within molten plastic as plastic pellets are plasticized in the injection molding machine (10), the pressurized gas and the pressurized moisture having a total pressure defining an internal counterpressure within the molten plastic; (b) pressuring air within a cavity (30) of a mold (22) in the injection molding machine (10) to an air pressure level which is substantially equal to the internal counterpressure in order to counterbalance the internal counterpressure as the molten plastic is injected into the cavity (30), thus providing a substantially pressure balanced molding environment for the plastic; and (c) maintaining the air pressure level in the cavity (30) substantially constant as the molten plastic is injected into the cavity (30). A control system is provided for maintaining desired differences between the air pressure in the cavity and the melt pressure in order to maintain a static pressure in the melt during injection to improve part quality and reduce manufacturing costs.

15 Claims, 6 Drawing Sheets

U.S. PATENT DOCUMENTS

| | | |
|---|---|---|
| 4,208,368 | 6/1980 | Egli . |
| 4,288,398 | 9/1981 | Lemelson . |
| 4,312,820 | 1/1982 | Arnold et al. . |
| 4,318,874 | 3/1982 | Lemelson . |
| 4,333,901 | 6/1982 | Young et al. . |
| 4,498,860 | 2/1985 | Gahan . |
| 4,636,084 | 1/1987 | Kopernicky . |
| 4,675,141 | 6/1987 | Kumazaki . |
| 4,685,872 | 8/1987 | Erlenbach . |
| 4,740,150 | 4/1988 | Sayer . |
| 4,750,409 | 6/1988 | Hendry . |
| 4,797,236 | 1/1989 | Kojima . |
| 4,824,732 | 4/1989 | Hendry et al. . |
| 4,852,028 | 7/1989 | Korpela et al. . |
| 4,923,666 | 5/1990 | Yamazaki et al. . |
| 4,923,667 | 5/1990 | Sayer . |
| 4,942,006 | 7/1990 | Loren . |
| 4,943,407 | 7/1990 | Hendry . |
| 5,098,637 | 3/1992 | Hendry . |
| 5,264,163 | 11/1993 | Lemelson . |
| 5,441,680 | 8/1995 | Guergov ................................. 264/40.1 |
| 5,482,669 | 1/1996 | Shah ........................................ 264/572 |
| 5,558,824 | 9/1996 | Shah et al. .............................. 264/40.3 |
| 5,566,743 | 10/1996 | Guergov .................................... 164/457 |

FOREIGN PATENT DOCUMENTS

| | | |
|---|---|---|
| 539684 | 1/1977 | U.S.S.R. . |
| 607649 | 5/1978 | U.S.S.R. . |
| 616061 | 7/1978 | U.S.S.R. . |
| 649567 | 2/1979 | U.S.S.R. . |
| 804193 | 2/1981 | U.S.S.R. . |
| 821053 | 4/1981 | U.S.S.R. . |
| 827259 | 5/1981 | U.S.S.R. . |
| 831315 | 5/1981 | U.S.S.R. . |

OTHER PUBLICATIONS

"Helga . . . The Gentle Approach To Gas–A" (Booklet). date unknown.

Pamplet: "TM Process13 Injection Molding of Structural Foam", date unknown.

International Preliminary Examining Authority, "Written Opinion", Mar. 15, 1996, 3 pages, Claim 1–9.

International Searching Authority, "Notification of Transmittal of the International Search Report or the Declaration", Apr. 9, 1996, 4 pages, Claims 1–4.

"Investigation of Processing–Structure–Property Relationships in Structural Foam Molding", Alex W. Kawczak & Duane Krueger, The Dow Chemical Company, pp. 67–78, date unknown.

"Injection Molding: Gas Counter Pressure Process", Integral/Structural Polymer Foams, Editors: G. Henrici–Olivé and S. Olivé; English by F.A. Shutov, 1986, pp. 71–41.

PRESSURE DIFFERENCE PROFILE

Processing

Mode:
Part Name:
Phase:

|  | | Set | Actual | Min | Max | |
|---|---|---|---|---|---|---|
| Delta P | Currently | ☐ | ☐ | ##### | ##### | psi |
|  | During Filling | ☐ | ☐ | ##### | ##### | psi |
|  | During Pack and Hold | ☐ | ☐ | ##### | ##### | psi |
| Nozzle Melt Pressure | Currently | ☐ | ☐ | ##### | ##### | psi |
|  | During Filling | ☐ | ☐ | ##### | ##### | psi |
|  | During Pack and Hold | ☐ | ☐ | ##### | ##### | psi |
| Cavity Pressure | Currently | ☐ | ☐ | ##### | ##### | psi |
|  | Air - During Filling | ☐ | ☐ | ##### | ##### | psi |
|  | Melt - During Pack and Hold | ☐ | ☐ | ##### | ##### | psi |
| Hydraulic Pressure | Currently | ☐ | ☐ | ##### | ##### | psi |
| Backpressure | During Plasticate | ☐ | ☐ | ##### | ##### | % pct. |
| Flow Rate |  | ☐ | ☐ | ##### | ##### | in/sec |
| Velocity |  | ☐ | ☐ | ##### | ##### | in |
| Screw Stroke |  | ☐ | ☐ | ##### | ##### | sec |
| Fill Time |  | ☐ | ☐ | ##### | ##### | sec |
| Cooling Time |  | ☐ | ☐ | ##### | ##### | sec |
| Air Pressure P1/P2 Time |  | ☐ | ☐ | ##### | ##### | deg F |
| Nozzle Temperature |  | ☐ | ☐ | ##### | ##### | deg F |
| Cavity temperature | Currently | ☐ | ☐ | ##### | ##### | deg F |
|  | Mold | ☐ | ☐ | ##### | ##### | deg F |
|  | Melt (End) | ☐ | ☐ | ##### | ##### |  |

Rheology

Mode:
Part Name:
Phase:

|  | Set | Actual | Min | Max |
|---|---|---|---|---|
| Filling Index | ☐ | ☐ | ##### | ##### |
| Injection Work | ☐ | ☐ | ##### | ##### |
| Integral 1 | ☐ | ☐ | ##### | ##### |
| Integral 2 | ☐ | ☐ | ##### | ##### |
| Flow Value | ☐ | ☐ | ##### | ##### |
| Stress | ☐ | ☐ | ##### | ##### |
| Shear | ☐ | ☐ | ##### | ##### |
| Delta Inj. Energy | ☐ | ☐ | ##### | ##### |
| Dynamic System Behavior | ☐ | ☐ | ##### | ##### |

INJECTION CONTROL SYSTEM

CROSS-REFERENCE TO RELATED APPLICATION

This application is a continuation-in-part of U.S. patent application Ser. No. 08/515,522 filed on Aug. 15, 1995, now U.S. Pat. No. 5,662,841, which is a continuation of U.S. patent application Ser. No. 08/236,471 filed on May 2, 1994, now U.S. Pat. No. 5,441,680.

REFERENCE TO MICROFICHE APPENDIX

This application includes a microfiche appendix of a ladder logic program listing spanning 46 frames of a single microfiche.

TECHNICAL FIELD

This invention relates to injection molding and more particularly to a method and apparatus which uses stress and flow calculations and closed loop control to monitor and maintain optimum melt pressures of molten material as it is processed by an injection apparatus.

BACKGROUND ART

When molten plastic is processed by an injection molding machine, the plastic enters a mold cavity where it is cooled to form a desired part shape. As the cooling occurs, the plastic contracts within the cavity. As a result of this contraction, the part actually shrinks in size, and sink marks or low spots often occur on the surface of the part. Shrink and sink marks have caused major problems for injection molders since injection molding was first developed. Several methods have been developed in an attempt to eliminate these problems. Some examples include gas-assisted injection molding, structural foam molding, liquid gas assisted molding, etc. In addition, foaming agents have been used in the molding process for mixing with molten plastic in order to generate inert gases in the plastic. These gases provide internal pressure in the plastic which enables the plastic to more fully fill the cavity of the mold and packs the plastic against the cavity walls. This, in turn, helps reduce sink on the surface of the plastic parts. Also, gas counterpressure in the mold cavity has been used to improve surface smoothness of molded parts.

These prior art methods are all problematic due to the large number of variables in the molding process. Varying injection pressures and injection speeds, varying melt pressures and temperatures, varying cavity conditions, and uncontrolled venting of gases all contribute to an unstable molding environment. These various problems in the molding process create burning and scission of polymer chains and create internal stresses within the plastic which remain in the plastic as the plastic material cools in the cavity. These internal stresses cause shrink, sink, and warpage of the plastic part to be molded. In addition, these various molding problems lead to degradation of the plastic material as it is processed through an injection molding machine. In general, erratic variations in pressure, temperature, and injection speed create material breakdown and cause internal problems in the plastic which show up in the final molded product.

Another disadvantage of prior art systems is that the plastic melt flow in these systems experiences changes in pressure due to changes in cavity geometry as the molten plastic moves into the cavity of the mold. These pressure changes cause certain areas of the cavity to be filled more quickly than other areas resulting in different cooling characteristics in different areas of the cavity. These cooling variations cause inconsistencies in the direction of plastic solidification, which results in surface stresses, weld lines, or sink.

It is desirable to use a balanced injection molding process in which the pressure of the molten plastic is continuously controlled as the plastic moves through the injection molding machine. It is further desirable for an injection molding process to balance pressures acting upon the molten material in order to eliminate the above referenced problems caused by variations in polymer chain conditions so as to reduce internal stresses in the plastic. The ultimate goal of such an injection molding process is to produce a final product which nearly perfectly matches the cavity surface of the mold, is fully relieved of internal stresses which lead to shrink, sink, and warpage, and has greatly improved mechanical properties. In addition, part weight may be reduced, which will provide significant material savings to the manufacturers of such products.

DISCLOSURE OF THE INVENTION

This invention stems from the realization that, when injecting molten material into a mold cavity, it is desirable to preload the system with pressure, which provides conditions under which pressure changes become measurable, and controllable pressure differences may be established between the pressure of gas in the mold cavity and the pressure of the molten material. By providing real time closed loop control, the gas pressure and static melt pressure of the molten material may be sensed and mathematically monitored by the controller in order to provide optimal pressure conditions for injection and solidification of the molten material into the mold cavity. This closed loop pressure control on the basis of pressure differences created from preprogrammed transition of a preloaded melt into a mold cavity provides the capability to control the static pressure of the melt throughout the injection and solidification cycle and to provide optimal injection and solidification pressure conditions for the melt as the melt moves from the melt holder and solidifies within the mold cavity.

A method of injection molding is provided for use with an injection molding machine, comprising: (a) generating internal counterpressure within molten plastic as plastic pallets are plasticized in the injection molding machine; and (b) pressurizing air within a cavity of a mold in the injection molding machine to an air pressure level which is substantially equal to the internal counterpressure in order to counterbalance the internal counterpressure as the molten plastic is injected into the cavity, thus providing a substantially pressure-balanced molding environment for the plastic.

Also provided is a method of reducing internal stresses in plastic parts formed in a mold cavity from molten plastic injected into the mold cavity by an injection molding apparatus. The method comprises: (a) pressuring the cavity to a predetermined air pressure; (b) operating the injection molding apparatus to develop molten plastic at a first melt pressure equal to the predetermined air pressure; (c) communicating the molten plastic with the mold cavity when the predetermined air pressure and first melt pressure become equal; and (d) subsequently increasing the melt pressure to a second melt pressure, and maintaining a substantially constant difference between the air pressure in the mold cavity and the second melt pressure during a substantial portion of a predetermined period of time in which the molten plastic is being injected into the mold cavity, whereby to optimize pressure conditions acting upon the molten plastic in a manner to reduce internal stresses in the plastic parts being formed.

The present invention also contemplates a method of injection molding for use with an injection molding machine including a mold with a cavity formed therein for receiving molten plastic and a hydraulic unit for creating an injection pressure to fill the mold cavity with molten plastic at a predetermined melt pressure. The method comprises: (a) supplying air to the cavity at a predetermined air pressure; (b) sensing the melt pressure during injection; (c) sensing the air pressure in the cavity during injection; and (d) providing a closed loop controller to monitor the sensed melt pressure and sensed air pressure and to produce signals to the hydraulic unit for maintaining the melt pressure at desired levels.

The present invention further provides a method of injection molding for use with an injection molding machine including a mold therein. The method comprises: (a) determining a maximum stress to be experienced by plastic as the plastic is processed in the mold; (b) generating counterpressure within the plastic prior to injection of the plastic into the mold, the counterpressure being substantially equal to the determined maximum stress; and (c) maintaining the counterpressure within the plastic at least equal to the determined maximum stress as the plastic is injected into the mold.

The present invention further contemplates a method of reducing internal stresses in plastic parts formed in a mold cavity from molten plastic injected into the mold cavity. The method comprises: (a) pressuring the cavity to a predetermined air pressure; (b) pressuring the melt to a first pressure equal to the predetermined air pressure; (c) communicating the molten plastic to the cavity when the pressures become equal; and (d) subsequently increasing the melt pressure to a second pressure for injection.

Also provided for use with an injection molding machine is a method of injection molding, comprising: (a) calculating a maximum stress to be experienced by a shot of plastic to be molded in the injection molding machine, the stress being a result of a volumetric shrink occurring as the plastic is cooled in a cavity of a mold in the machine; (b) pressurizing a shot of plastic to a first melt pressure as the plastic is plasticized in a barrel of the injection molding machine, the first melt pressure being substantially equal to the calculated maximum stress; (c) pressurizing air within the cavity to an air pressure substantially equal to the first melt pressure; (d) commencing injection of the shot of plastic into the cavity in a laminar flow manner, wherein molten plastic flows into said cavity concentrically with respect to a point at which plastic enters the cavity; (e) increasing the melt pressure on the shot of plastic to a second melt pressure, while maintaining the air pressure within the cavity substantially constant, and maintaining a substantially constant difference between the air pressure within the cavity and the second melt pressure during a substantial portion of a period of time which the shot of plastic is being injected into the cavity; (f) sensing the first and second melt pressures and generating feedback signals indicative thereof; (g) receiving said feedback signals, comparing said feedback signals to reference values, and producing signals for controlling said first and second melt pressures; and (h) returning to step (b).

Further provided is a mold for use in an injection molding machine, comprising a front half and a back half of the mold. The front half includes an aperture formed therethrough for receiving molten plastic from the injection molding machine. The front half and back half cooperate to form a cavity therebetween, and the cavity is in fluid flow communication with the aperture to receive molten plastic therefrom. A plurality of vents are formed in one of the back half and front half, the vents having first and second ends thereof. The first end of each of the plurality of vents is in fluid flow communication with the cavity. The vents are configured according to the following formula to maintain a substantially constant air pressure in the cavity as the cavity is being filled with plastic: $A = 0.24241 * W * \sqrt{T1}/(C * P1)$, where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit. A channel is formed in one of the back half and the front half, the channel being in fluid flow communication with the second end of each of the plurality of vents for transferring pressurized air into and out of the cavity through the vents. A pair of valves are provided in selective fluid flow communication with the channel. One of the pair of valves is adapted to selectively receive pressurized air from a pneumatic line to provide pressurized air to the channel, and the other of the pair of valves is adapted to selectively allow discharge of pressurized air from the channel. A seal is circumscribed around the cavity and positioned between the front half and back half to prevent discharge of pressurized air from the cavity between the front half and the back half of the mold as the cavity is being filled with molten plastic.

Accordingly, an object of the present invention is to provide a method of injection molding in which a pressure-balanced molding environment is provided for cooling the molten plastic.

A further object of the present invention is to provide a method of injection molding in which degradation of plastic material is decreased as a result of improved processing controls.

Another object of the present invention is to provide a method of injection molding in which less turbulence is created as the molten plastic is injected into the cavity of a mold.

Yet another object of the present invention is to provide a method of injection molding in which surface stresses in the final product are greatly decreased.

A further object of the present invention is to provide a method of injection molding in which shrink, sink, and warpage of the molded part are reduced.

Another object of the present invention is to provide a method of injection molding in which molten plastic cools and solidifies in a consistent, directional manner.

Still another object of the present invention is to provide a method of injection molding in which processing cycle time is reduced, and part weight is reduced.

A still further object of the present invention is to provide a mold capable of maintaining a desired air pressure within a cavity thereof.

These and other features, objects and advantages of the present invention will become apparent upon reading the following description therefor together with reference to the accompanying drawings.

BRIEF DESCRIPTION OF THE DRAWINGS

FIGS. 9a and 9b illustrate an operator interface for entering control parameters and monitoring control variables for one embodiment of the present invention.

BEST MODES FOR CARRYING OUT THE INVENTION

Figure 1:
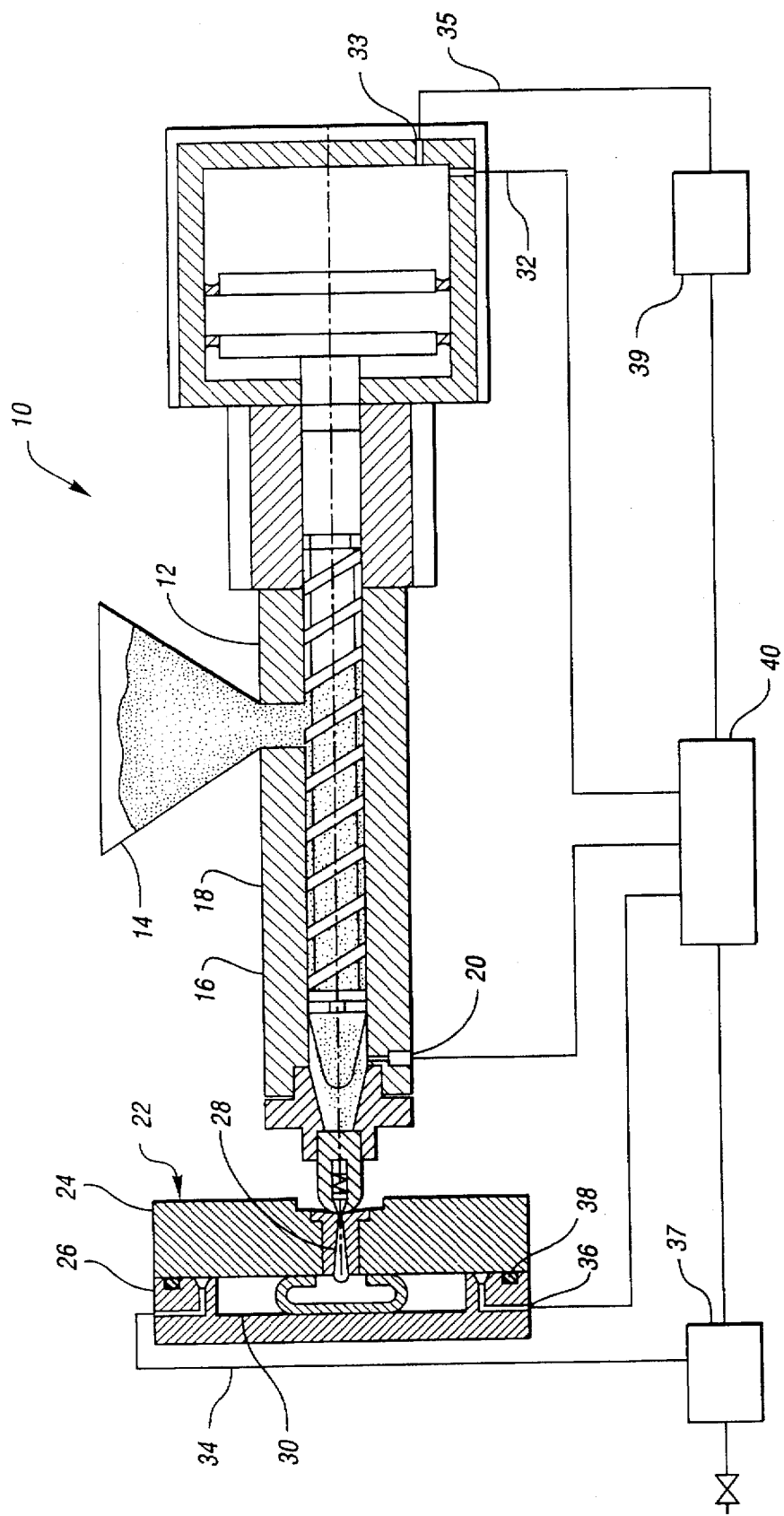
FIG. 1 is a schematic of an injection unit for an injection molding machine having a mold and pressure control system connected thereto according to the present invention.

Referring to FIG. 1, an injection molding machine 10 is shown, including an injection unit 12, for use according to the present invention. Plastic resin moves from a hopper 14 into a barrel 16 of the injection molding machine. Heat from barrel 16 and rotational movement of a screw 18 cause the plastic resin to melt and form a shot of plastic to be molded by the machine. The shot of plastic is pressurized by the machine. The melt pressure of the shot of plastic is measured and regulated through a melt pressure transducer 20. A positive shutoff valve is provided at the top of barrel 16 to prevent drool of plastic through the nozzle and to allow pressurization of molten plastic in barrel 16.

A mold 22 is inserted into injection molding machine 10. Mold 22 includes a front half 24 and back half 26. Front half 24 has an aperture 28 formed therethrough for receiving the shot of molten plastic from the injection molding machine. Front half 24 and back half 26 of mold 22 cooperate to form a cavity 30 therebetween. Cavity 30 is in fluid flow communication with aperture 28 for receiving the shot of molten plastic therethrough. The shot of molten plastic is packed into cavity 30 and held therein in order to cool and form a plastic part matching the shape of cavity 30.

Transducers are provided for sensing pressures throughout the molding process. Injection pressure for injection unit 12 is monitored by an injection pressure transducer 32. Air pressure is provided to cavity 30 of mold 22 through a pneumatic line 34. Air pressure in cavity 30 is monitored by an air pressure transducer 36 located in a vent so that a true pressure reading may be taken from the cavity. The vent with the pressure transducer will be discommunicated from channel 44. A rubber seal 38 is provided between front half 24 and back half 26 of mold 22 to prevent escape of pressurized air from cavity 30 of the mold. Often, when molten plastic is injected into a mold under high pressure, front half 24 and back half 26 will separate slightly, thus allowing escape of pressurized air therefrom. Rubber seal 38 is designed to prevent such an escape of pressurized air from cavity 30.

A closed-loop controller 40 is provided with the injection molding machine 10. The closed-loop controller 40 receives signals from various transducers, such as pressure transducers 20, 32, and 36 to monitor injection molding machine 10 throughout the molding process. The controller implements various logic rules to generate control signals based on the signals received from the various transducers. These signals are then communicated to appropriate actuators, such as pneumatic system 37, hydraulic system 39, hydraulic valves 33, and pneumatic valves 46 and 48, to maintain control of injection molding machine 10 throughout the injection molding process. In a preferred embodiment, closed-loop controller 40 is a commercially available programmable logic controller (PLC) with standard control software for controlling an injection molding machine, such as the PROSET 700 available from the Allen-Bradley Company in Milwaukee, Wis. The standard control software is supplemented with custom logic according to the present invention as illustrated and described in greater detail with reference to FIGS. 7–9.

Figure 2:
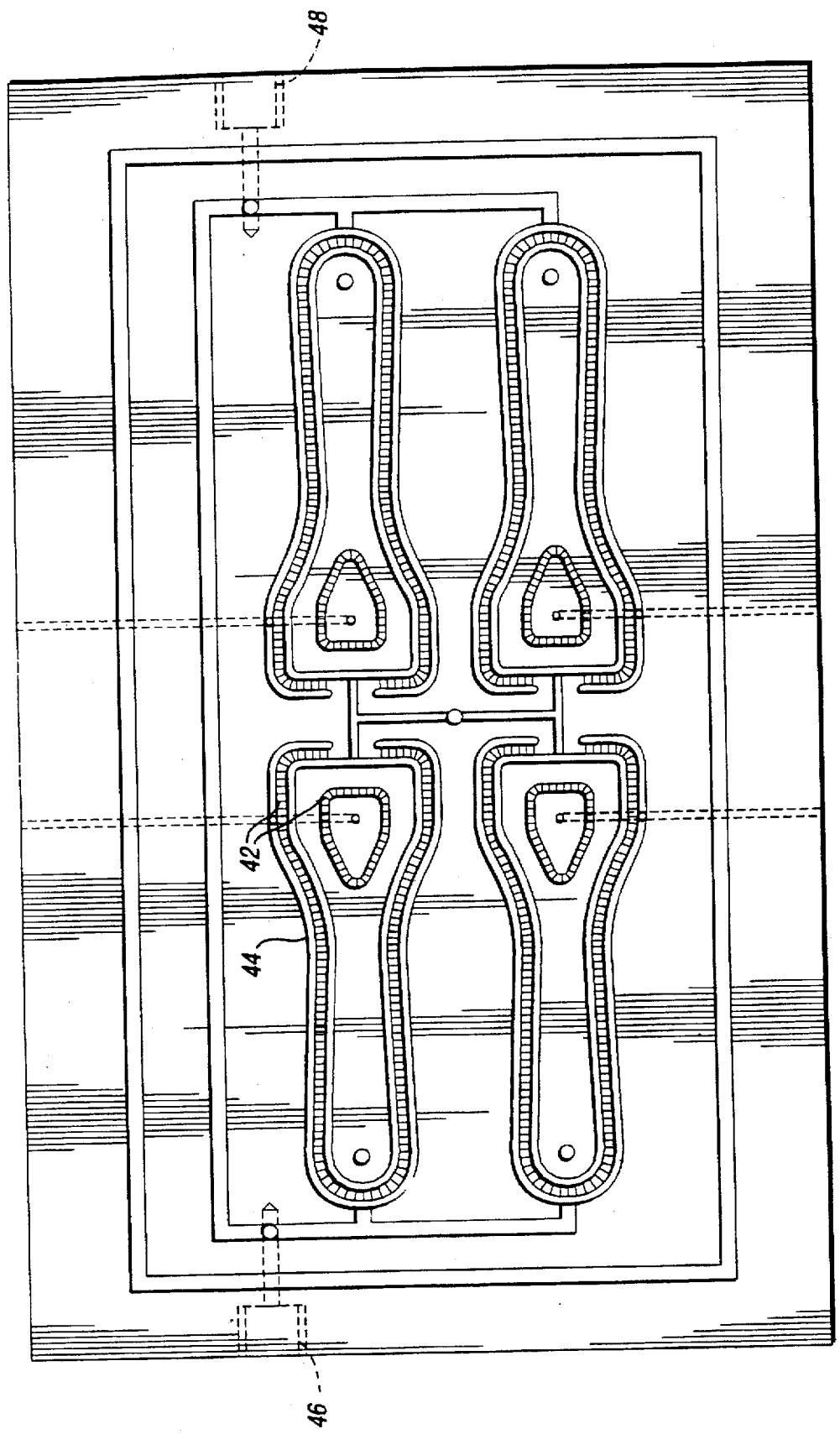
FIG. 2 is plan view of a back half of a mold according to the present invention.

Referring to FIG. 2, a plurality of vents 42 are shown in fluid flow communication with cavity 30. The purpose of these vents is to allow discharge of pressurized air and gases as molten plastic is injected into cavity 30. A channel 44 is provided around cavity 30 in fluid flow communication with vents 42. The pressurized air and gases move through the vents into the channel. A first valve 46 is provided in selective fluid flow communication with channel 44 for providing a pressurized gas from pneumatic line 34 to channel 44. Preferably, the gas is air although other gases such as nitrogen may also be used.

As also shown in FIG. 2, a second valve 48 is provided in selective fluid flow communication with channel 44 for release of pressurized air therefrom. The purpose of this sealed and valved venting system is to provide venting orifice controls immediately in front of the melt flow, rather than outside of the mold. In this manner, cavity air pressure may be provided to resist the melt pressure as molten plastic is injected into the cavity.

The air pressure in the cavity is used to manipulate the static pressure of the melt to increase mobility of the liquid plastic molecules so that they may bond together more efficiently and equalize the density of the part while compensating volumetric deficits as the plastic solidifies. The internal static pressure also resists shrinkage forces at the final stages of filling and after filling is complete. When the cavity is completely filled, the prebuilt static pressure not only compensates shrinkage forces but also counteracts surface tension while increasing mobility of the melt for compensating the volumetric deficits created within the first solidification layers.

A method according to the present invention for use with the above described apparatus is based upon the fact that each volumetric unit of molten plastic injected into the cavity will shrink due to adjustment of surface tension forces during cooling, and substantial stresses will build up in the solid part. These conditions may be alleviated by creation of entrained gases within the molten plastic. These entrained gases will act as a lubricator by substantially changing the fluidity of the melt and decreasing the amount of injection pressure required to inject the molten plastic into the cavity. The entrained gases cause the molten plastic to be much more pliable and easier to manipulate. Also, the predicted volumetric difference between the volume of the mold cavity and the volume of a solid part molded by the cavity can be used as a basis for premixing the molten plastic in the barrel at sufficient pressure to resist the volumetric shrink and eliminate the internal stresses.

By generating a certain desired amount of entrained gases and moisture within the molten plastic, a level of partial pressure of the entrained gases and moisture may be established at which movement of the pressurized gas and moisture will be stopped. Also, the decomposition of the gases may be stopped and the gases may be forced to maintain a static position by means of balanced surface tension forces. In addition, negative pressures in the solidifying plastic are eliminated.

The venting system shown in FIG. 2 creates the possibility of maintaining a constant gas pressure resistance in the cavity, which eliminates uneven flow distribution of the molten plastic in the cavity. The molten plastic will be distributed substantially concentrically in the cavity space with respect to aperture 28. This provides the unique possibility for the melt to travel in the cavity and solidify in the cavity under the same pressure characteristics at all sections of the part. This also eliminates the possibility of gases entrained within the molten plastic traveling to the surface of the shot of the plastic. The feeding rate of the molten plastic into the cavity is maintained constant in all areas of the cavity. This constant feeding rate along with the internal pressures created in the entrained gases and moisture provide the advantage of increasing the cooling rates because of earlier pressurized contact of the molten plastic with the cavity walls. This pressurized contact allows the molten plastic to cool more quickly as a result of heat dissipation through the walls of the cavity. Increased cooling rates result in substantial cycle time reduction which leads to considerable savings for the manufacturer.

Controlling the air pressure in the cavity of the mold provides the capability of establishing a balanced molding environment for the molten plastic. Processing the molten plastic under these conditions prevents degradation and scission of the polymers which are normally chemically attacked by decomposition products in the presence of moisture.

As a result of the pressure balance between the air pressure in the cavity and the melt pressure, the development of surface tension in the plastic is avoided. Effectively, this balanced pressure system creates a directional solidification of the plastic. In other words, the molten plastic cools in a constant, straight line from the surface of the molten plastic to the center of the plastic. This directional solidification eliminates surfaces stresses, which lead to shrink, sink, and warpage of the part. The end result of this process is the production of a part which is free of shrink and sink, fully stress relieved, and a nearly exact copy of the cavity surface. Furthermore, this process produces parts having strong mechanical properties and configuration stability in addition to enhanced structural integrity.

In accordance with a preferred embodiment of the present invention, a method of injection molding for use with an injection molding machine is provided. The first step is to calculate a maximum stress to be experienced by a shot of plastic to be molded in injection molding machine 10 in accordance with the particular mold cavity configuration, the stress being a result of volumetric shrink occurring as the plastic is cooled in cavity 30 of mold 22. Assuming that the part to be molded is an elongate rod having a rectangular cross-section, the following formulas apply. The maximum uniform load experienced by the part as a result of shrink is calculated as follows:

$$q = \frac{yEh^3 \left[1 + 1.05\left(\frac{a}{b}\right)^5\right]}{ka^4}$$

where q is a uniform load per unit area, a is width of the cavity, b is thickness of the cavity, h is height of the cavity, E is apparent modulus of elasticity of the plastic, k is a variable based upon heat deflection temperature of the plastic, and y is a shrinkage factor of the plastic.

The uniform load calculation equations will vary, depending upon the configuration of the part and the plastic to be processed. Of course, these formulas may be programmed into controller 40 so that an operator is only required to enter the properties of the plastic to perform the process.

A maximum mechanical stress to be experienced by the shot of plastic is then calculated in accordance with the maximum uniform load:

where S (mechanical) is a maximum mechanical stress to be experienced by the part, a is width of the $$S(\text{mechanical}) = \frac{qa^2}{2h^2 \left[1 + .0623\left(\frac{a}{b}\right)^6\right]}$$

cavity, b is thickness of the cavity, h is height of the cavity, and q is the uniform load per unit area.

Again, the maximum mechanical stress calculation equations will vary depending upon part configuration.

A maximum thermal stress to be experienced by the shot of plastic is then calculated in accordance with the following formula:

$$S \text{ (thermal)} = dT * L * E$$

where S (thermal) is a maximum thermal stress to be experienced by the part, dT is a change in the temperature of the plastic between room temperature and the temperature at which the plastic is in a plastic range of deformation, L is a thermal coefficient, and E is a modulus of elasticity of the plastic.

Finally, the maximum stress to be experienced by a shot of plastic is determined to be the greater value of S (mechanical) and S (thermal).

The next step in the process is to pressurize a shot of plastic to a first melt pressure as the plastic is plasticized in barrel 16 of injection molding machine 10, the first melt pressure being substantially equal to the calculated maximum stress. Preferably, controller 40 actuates a heater to melt the shot of plastic. Controller 40 also communicates with a hydraulic cylinder and a corresponding pressure transducer to generate control signals to produce the first melt pressure.

Cavity 30 is then pressurized to an air pressure which is substantially equal to the first melt pressure. Preferably, controller 40 communicates with one or more pneumatic solenoid valves and at least one corresponding pressure transducer to control and monitor this pressurization. Injection of the shot of plastic into the cavity is commenced after the air pressure has reached the first melt pressure as indicated by the appropriate pressure transducers and determined by controller 40. As the molten plastic enters cavity 30, the air pressure in cavity 30 acts against the melt pressure in order to provide a pressure balance for the molten plastic.

The maintenance of a pressure difference between the dynamic melt pressure and air pressure in the cavity (preferably via closed-loop control using controller 40) maintains a static pressure within the molten material as it is injected into the mold cavity. This static pressure provides venting power to the melt. This venting power allows the melt to vent, fill, and pack out any ribs or bosses which exist lateral of the flow direction of the molten material. Accordingly, the molten material fully packs out the mold cavity as it moves through the cavity. The static pressure created by the pressure difference also prevents trapping of gases from mold release spray and trapping of moisture from mold release spray.

The "static pressure" is the pressure of the melt acting in all directions, while the "dynamic pressure" is the pressure of the melt in the flow direction. For example, if the dynamic melt pressure is equal to the air pressure in the cavity, then the melt will not flow into the cavity. However, if air pressure is less than the dynamic melt pressure, then the melt will move into the cavity, and the result of the air pressure pushing against the oncoming melt front is to create a "static" pressure in the melt which acts in all directions, including laterally to the flow direction. The air pressure in the cavity acts to compress the melt as it flows into the mold cavity, which creates a general internal static pressure in the molten material as the material tends to expand against this air pressure resistance. This static melt pressure provides pressures or forces acting laterally to the flow direction which helps to force the molten material against the walls of the mold cavity in order to "pack out" the material from inside so that it is fully pressed against the walls of the cavity.

The static pressure also gives the molten material "venting power". This is the ability of the molten material to enter into lateral indentations (or ribs) in the mold cavity and push any air or other gases out of that indentation (i.e., "vent out"). Thus, the molten material can fully fill the indentation (or rib) and "pack out" that area as it flows past the indentation due to its dynamic pressure. The static pressure also counteracts volumetric shrinkage forces for prevention of sink marks or internal voids.

Figure 4:
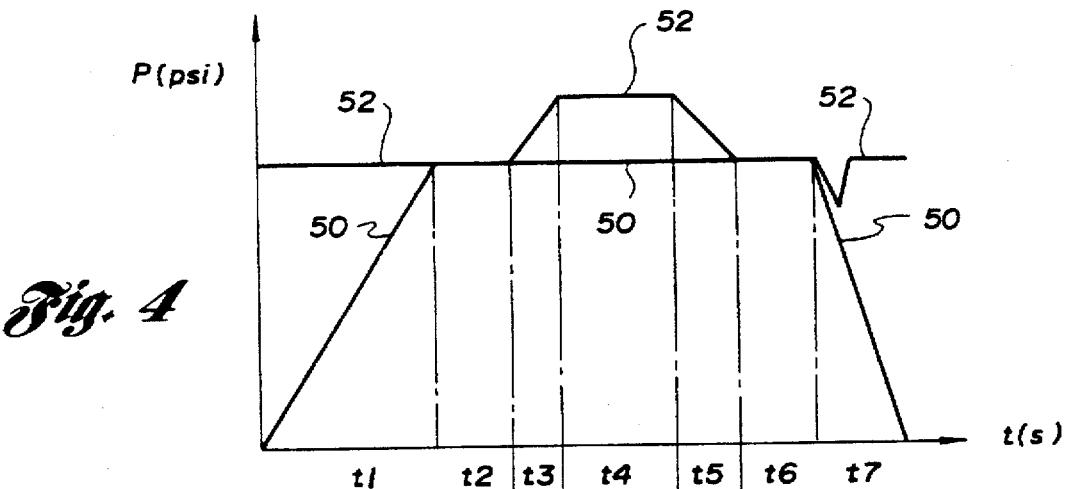
FIG. 4 is a graphical illustration of a melt pressure and air pressure cycle in an injection molding machine according to the present invention.
Figure 5:
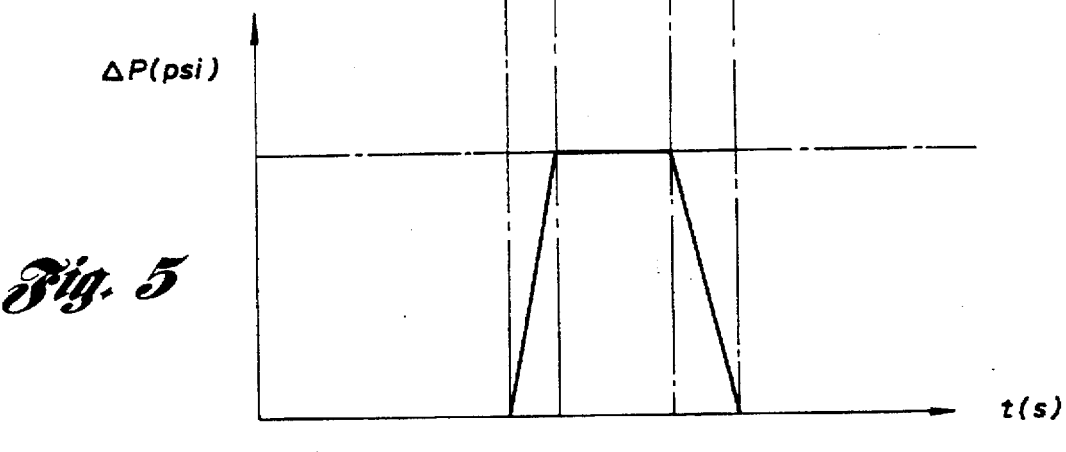
FIG. 5 is a graphical illustration of a pressure difference profile between a melt pressure and an air pressure in an injection molding machine according to the present invention.

As the shot of plastic is injected into the cavity, the melt pressure on the shot of plastic is increased from the first melt pressure to a second melt pressure, while maintaining the air pressure within the cavity substantially constant. In addition, a substantially constant difference between the air pressure within the cavity and the second melt pressure is maintained during a substantial portion of a period of time in which the shot of plastic is being injected into the cavity. Reference to FIGS. 4 and 5 further illustrates this method.

Referring to FIG. 4, the air pressure 50 in cavity 30 and the melt pressure 52 of the molten plastic are illustrated as a function of time. During the period of time t1, the air pressure 50 is built up to equal the melt pressure 52. This is preferably accomplished via controller 40 sending appropriate control signals to pneumatic valves 46 and 48, and hydraulic valves 33 while monitoring the signals produced by the corresponding pressure transducers 36, and 20 and 32, respectively. The time period t2 is a relaxation time to allow the air pressure to equalize with the melt pressure. During time period t3, the melt pressure is increased by increasing the hydraulic pressure applied via hydraulic system 39 and hydraulic line 35 from the first melt pressure to the second melt pressure and injection of the molten plastic into the cavity begins. During time period t4, controller 40 effects closed-loop control of the pressure difference between the second melt pressure and air pressure 50 such that the difference is maintained substantially constant, as shown in FIG. 5. This difference is controlled by establishing a single "core variable" for the controller which may be adjusted by various other operating parameters illustrated and described with reference to FIG. 7. During time period t5, melt pressure 52 is decreased from the second melt pressure to the first melt pressure, and the melt and air pressures are equalized during time period t6. At time t7, air pressure 50 in the cavity is released and the next shot of plastic is prepared.

The present invention contemplates that no specific pressure profiles are required for the air pressure or the melt pressure. The key to this invention is the preloading of the system and the maintenance of a pressure difference between the air pressure and the melt pressure for a substantial portion of the injection via closed-loop control. The value for the pressure difference is generated in accordance with the specific usage requirements of a particular application in order to control the amount of dynamic pressure (which is related to static pressure), and the pressure difference may vary accordingly. Therefore, the air pressure and melt pressure may be decreased or increased in accordance with any pressure profile, so long as the pressure difference between the melt pressure and air pressure is maintained substantially constant. Furthermore, it is not a requirement that the air pressure be originally set equal to the maximum stress calculation. Again, the key is the development and maintenance of a pressure difference between the air pressure and melt pressure as the molten plastic is injected into the cavity. Varying air pressure and melt pressure profiles are contemplated under the present invention.

Finally, the method is repeated by returning to the step of pressurizing the next shot of plastic to a first melt pressure in barrel 16. Accordingly, injection molded products are produced repeatedly.

It is further preferable to inject the shot of plastic into cavity 30 from barrel 16 at relatively low rates. Manufacturers commonly provide suggested injection speed limits specified as high and low speed values. It is desirable to inject a molten plastic into the cavity in the lower 10% of rates suggested by the manufacturer in order to decrease turbulence and material degradation of the plastic. Similarly, manufacturers provide high and low injection pressure values. It is desirable to inject the plastic into the cavity at an injection pressure in the lower 10% of ranges suggested by the manufacturer. Filling the cavity at low injection speeds and low injection pressures avoids destruction and degradation of the polymer chains.

The present invention further provides a method of injection molding for use with an injection molding machine comprising: (a) forming a plurality of vents 42 in a mold for use in the injection molding machine, the mold having a cavity formed therein, the vents being in fluid flow communication with the cavity 30 of the mold to vent pressurized air from the cavity, while maintaining a substantially constant air pressure in the cavity, according to the following formula: $A = 0.24241 * W * \sqrt{T1}/(C * P1)$, where A is a cross-sectional area of the vent, W is discharge of air through the vent in pounds per second, C is a coefficient of flow, P1 is the air pressure in the cavity in pounds per square inch, and T1 is a temperature in the cavity in degrees fahrenheit; (b) forming a channel 44 in the mold in fluid flow communication with the vents 42; (c) sealing the mold to prevent leakage of pressurized air from the cavity and from the channel; (d) providing first and second valves 46,48 in selective fluid flow communication with the channel 44 formed by the mold, the first valve 46 being selectively movable between a closed position wherein pressurized air is prevented from moving therethrough and an open position wherein pressurized air is allowed to enter the channel 44 therethrough, and the second valve 48 being selectively movable between a closed position wherein pressurized air is prevented from moving therethrough and an open position wherein pressurized air is allowed to discharge therethrough from the channel 44; (e) calculating a maximum stress to be experienced by a shot of plastic to be molded in the injection molding machine, the stress being the result of volumetric shrink occurring as the plastic is cooled in the cavity of the mold; (f) pressurizing a shot of molten plastic in the barrel 16 of the injection molding machine to a first melt pressure, the first melt pressure being substantially equal to the maximum stress; (g) moving the first valve 46 to the open position; (h) moving the second valve 48 to the closed position; (i) introducing pressurized air through the first valve 46 into the cavity 30 until the air pressure in the cavity is substantially equal to the first melt pressure; (j) moving the first valve to the closed position; (k) commencing injection of the shot of plastic into the cavity 30; (l) increasing the melt pressure of the shot of plastic to a second melt pressure; thus creating a pressure difference between the second melt pressure and the gas pressure in the cavity; (m) maintaining the pressure difference between the second melt pressure and the air pressure in the cavity substantially constant for a substantial portion of the period of time in which plastic is being injected into the cavity; (n) moving the second valve 48 to the open position to release pressurized air from the channel; and (o) returning to step (f).

It should be understood that these steps need not necessarily be performed sequentially. Variations in the order of the steps provided in this method are contemplated as part of the present invention.

Reference to FIG. 4 provides a basis for description of the valves 46,48 and the venting system as provided in the second embodiment of the present invention described above. Beginning with step (h) of the second embodiment of the present invention, the first valve 46 is moved to the open position and the second valve 48 is moved to the closed position prior to the time period t1 of FIG. 4. During the t1 period, pressurized gas (preferably air) is introduced through the first valve 46 into the cavity 30 until the pressure in the cavity is substantially equal to the first melt pressure. The first valve 46 is then moved to the closed position. The first and second valves remain closed as the molten plastic is injected into the cavity. A pressure difference is then established and maintained between the pressure in the cavity and a second melt pressure for a substantial period of time (t4). The melt pressure and cavity pressure are then equalized (t5,t6), and the second valve 48 is moved to the open position to release pressurized gas from the channel (T7).

The purpose of this closed venting system is to provide a molding environment for the molten plastic wherein pressures acting upon each individual gas molecule are balanced so that very little movement of gas occurs within the plastic between adjacent molecules. This balance prevents gas molecules from moving toward the surface of the plastic or uniting with other gas molecules to form larger voids or cells.

One skilled in the art will appreciate the utility of adding chemical blowing agents to the molten plastic. Chemical blowing agents are useful in controlling the amount of gas decomposed and entrained in the melt during plastification. These blowing agents generate inert gases when heated. The gases create voids in the material which can lead to substantial weight reduction of the part. The pressure of these voids may be used to help fill the cavity and to pack out the plastic against the walls of the cavity.

Figure 3:
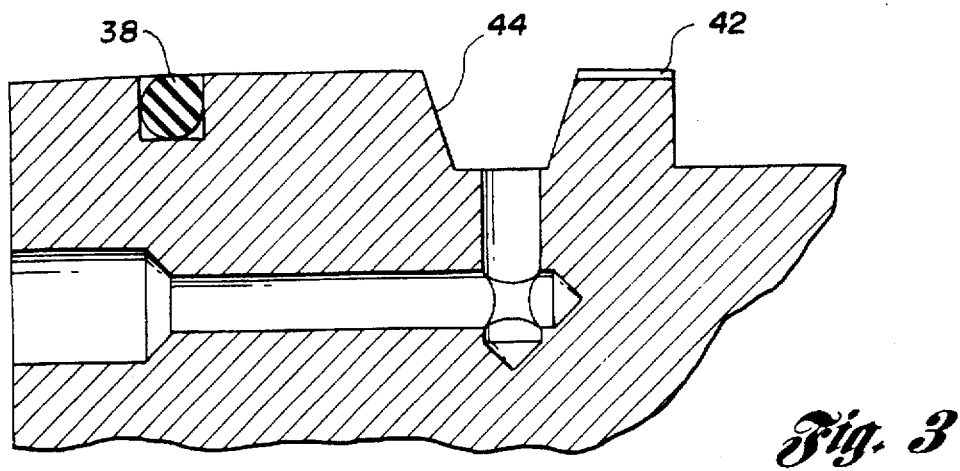
FIG. 3 is a vertical cross-sectional view taken through FIG. 2 of an injection mold according to the present invention.

Referring to FIGS. 1–3, the present invention further provides a mold 22 for use in an injection molding machine 10. The mold has a front half 24 and a back half 26, the front half 24 having an aperture 28 formed therethrough for receiving molten plastic from the injection molding machine. Front half 24 and back half 26 cooperate to form a cavity 30 therebetween. Cavity 30 is in fluid flow communication with aperture 28 to receive the molten plastic therefrom. A plurality of vents 42 are formed in back half 26 of the mold, as shown in FIG. 2. Vents 42 have first and second ends thereof. The first end of each of the plurality of vents is in fluid flow communication with cavity 30. The vents are configured according to the following formula to maintain a substantially constant air pressure in cavity 30 as the cavity is being filled with plastic: $A = 0.24241 * W * \sqrt{T1}/(C * P1)$, where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit.

A channel 44 is formed in back half 26 of the mold. Channel 44 is in fluid flow communication with the second end of each of the plurality of vents 42. Cavity 30, vents 42, and channel 44 are shown in FIG. 3. A pair of valves 46, 48 are in selective fluid flow communication with channel 44. The first valve 46 is adapted to selectively receive pressurized air from a pneumatic line 34 to provide pressurized air to channel 44. The second valve 48 is adapted to selectively allow discharge of pressurized air from channel 44.

A rubber seal 38 is provided in back half 26 of the mold and circumscribes cavity 30 and channel 44, and is positioned between front half 24 and back half 26 to prevent discharge of pressurized air from cavity 30 and channel 44 as cavity 30 is being filled with molten plastic. Upon injection, front half 24 and back half 26 have a tendency to separate slightly. Rubber seal 38 prevents leakage of pressurized air from the cavity when this separation occurs.

Figure 6:
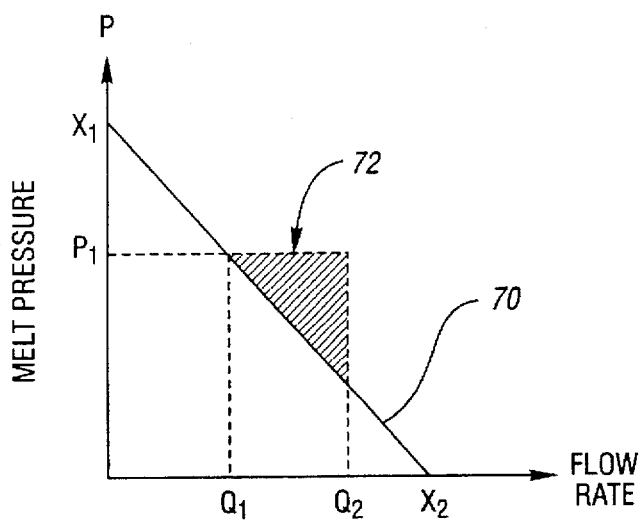
FIG. 6 is a graphical illustration of an injection power curve illustrating the advantages of the present invention.

The injection power curve shown in FIG. 6 further illustrates the advantages of the present invention. Using prior art systems, the injection pressure or melt pressure and flow rate are limited by the power curve line 70. At point $X_1$, the mold cavity is full and maximum injection pressure is received from the machine. At $X_2$, there is no mold resistance, and maximum flow rate is achieved. A line connecting these two points defines the limit of power available in this system. For example, if the dynamic melt pressure P is calculated to be $P_1$, the flow rate is limited to $Q_1$ in accordance with the prior art systems. However, this flow rate may be too low to support the feeding of solidifying material during filling of the mold because cooling occurs too quickly. Therefore, in accordance with the present invention, an air pressure 72 is added to the other side of the melt, the power curve line 70 is therefore no longer limiting and the mold cavity can be effectively fed at a high flow rate using a high pressure. Effectively, the static pressure created gives the possibility to exceed the maximum machine power curve in accordance with the prior art and to achieve pressures and flow rates within the cross-hatched area of FIG. 6.

Figure 7:
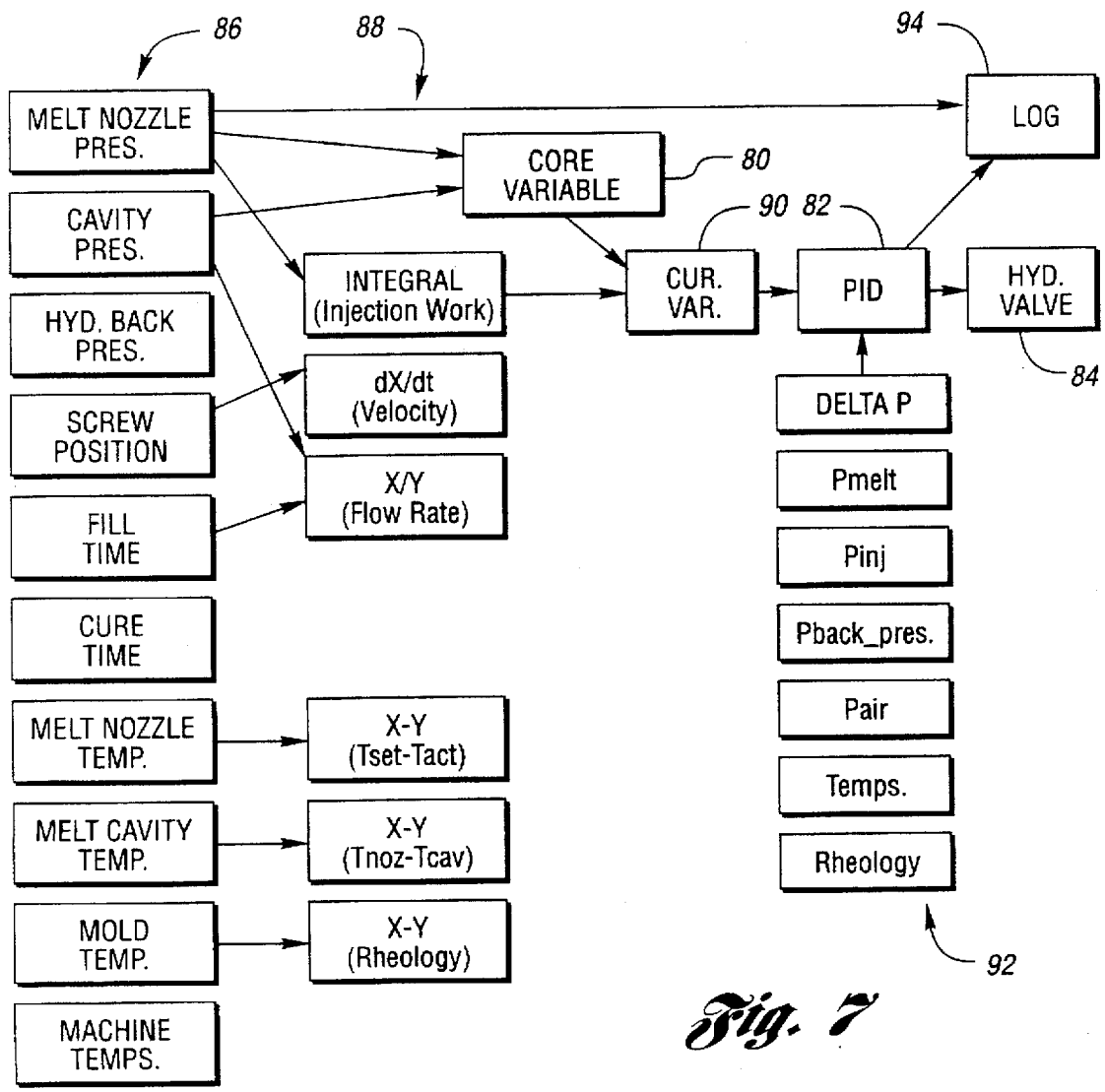
FIG. 7 is a graphical representation of a closed loop control system according to the present invention.

Referring to FIG. 7, a graphical representation of a control system according to the present invention is illustrated. The present invention provides a control system which utilizes a core variable, represented generally by reference numeral 80, as the input to a standard proportional-integral-differential (PID) control loop 82 to control the injection molding process. The output of control loop 82 is a signal which controls a hydraulic valve 82, which is preferably one of hydraulic valves 33 illustrated in FIG. 1.

As illustrated in FIG. 7, the control system of the present invention provides an open architecture for the injection molding process engineer to adapt and refine the molding process for particular parts and materials using any one or more process variables, represented generally by reference numeral 86. Process variables 86 represent the physical values obtained from various sensors, such as pressure transducers 20 and 36. These physical values are processed by controller 40, or alternatively by external signal conditioners, or both. The processing may include any of a number of variable calculations, indicated generally by reference numeral 88, which are used for unit conversion, scaling, and to reflect the importance of the particular variable to an application of interest. These calculations may incorporate expert, knowledge, or rule based algorithms, heuristic algorithms, fuzzy logic, genetic algorithms, or the like which would effectively modify the response of the control system for particular applications, parts, or materials.

Process variables 86 may be used directly (with or without external scaling), or via variable calculations 88 to adjust core variable 80 and generate a current control variable 90. The process variables 86 may be acted upon by an integral, differential, summation, etc., and may then be scaled by a scaling equation (such as $x = ay + b$, where a is the scaling factor, y is the result of calculation 88, b is an offset, and x is the current variable adjustment), the scaled variable will then be used to adjust the current control variable 90.

The current control variable 90 represents the feedback signal for PID control loop 82. Any of a number of desired set points, represented generally by reference numeral 92, may be selected as an input to PID control loop 82 which represents the "desired" value for the output. As such, PID control loop 82 will continuously adjust the signal generated for hydraulic valve 84 throughout the injection molding process to minimize the error between the value of current variable 90 and the value of desired set point 92.

The various values from the process variables 86, variable calculations 88, core variable 80, current variable 90 and PID loop 82 may be logged (illustrated as box 94) for creation of further expert algorithms.

Figure 8:
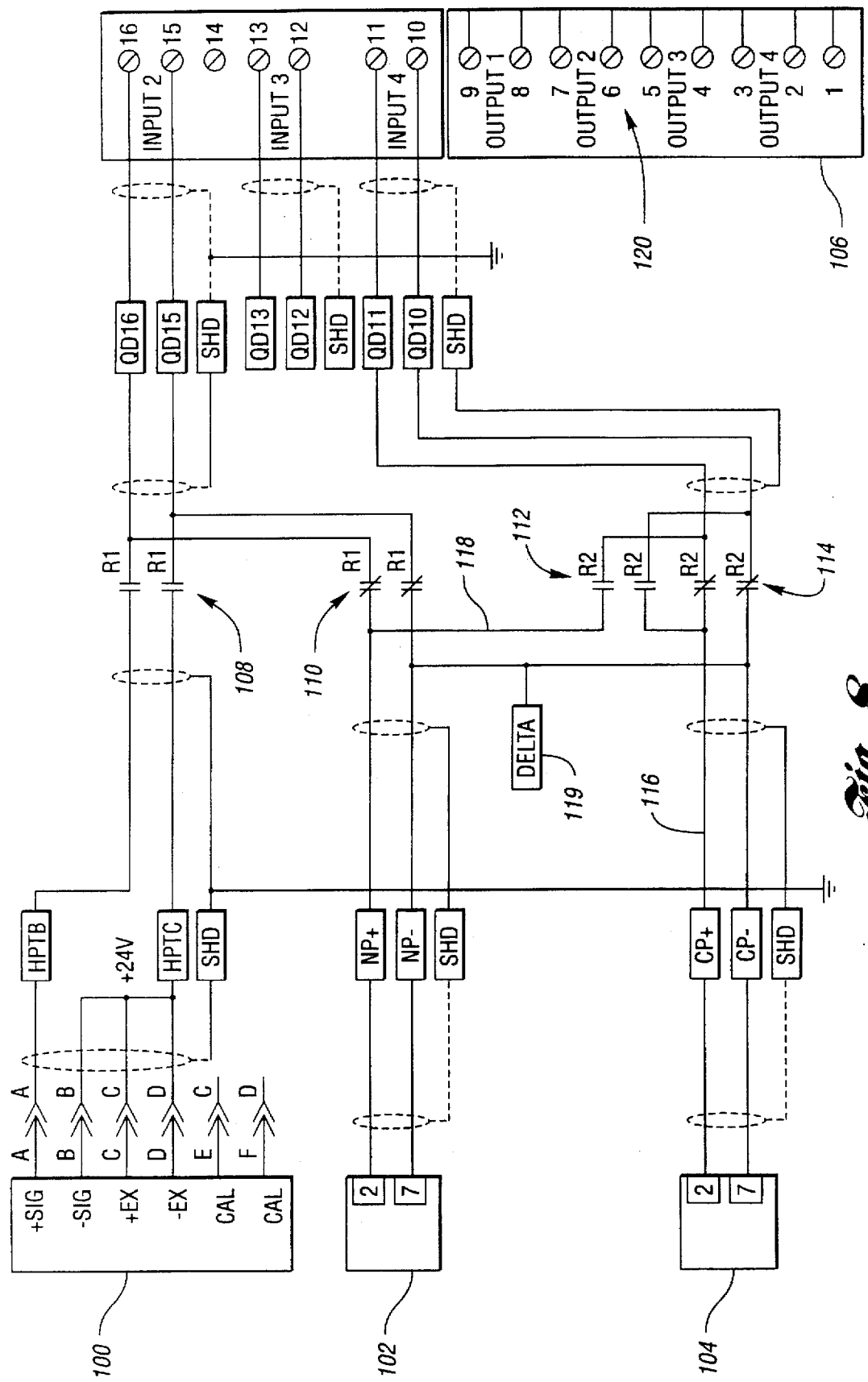
FIG. 8 is an electrical schematic of one implementation illustrating the creation of a core variable according to the present invention.

Referring to FIG. 8, an electrical schematic is shown illustrating one implementation for creating a core variable according to the present invention. The particular implementation illustrated was necessary to overcome limitations (most notably the scan rate) of the PLC used in a preferred embodiment. As such, other implementations may be required depending upon the particular controller utilized. In the implementation illustrated, a signal conditioning module 100 for a hydraulic pressure transducer, a pressure controller with built-in signal conditioning 102 for a nozzle melt pressure transducer, and a pressure controller with built-in signal conditioning 104 for a mold cavity pressure transducer are connected to an input/output (I/O) module 106 of the process controller and in selective communication therewith via relay contacts 108, 110, 112, and 114. In a preferred embodiment, signal conditioner 100, and pressure controllers 102, 104 are manufactured by Dynisco Corporation and I/O module 106 is a 1771-QDC module available from Allen-Bradley.

In operation, when relay R1 is energized, normally open contacts 108 provide an electrical communication path from conditioning module 100 to I/O module 106 while simultaneously electrically disconnecting conditioning module 102 via normally closed contacts 110. Conversely, when relay R1 is not energized, conditioning module 102 (and therefore the nozzle melt pressure transducer) is electrically connected to I/O module 106 while conditioning module 100 (and its associated hydraulic pressure transducer) is electrically disconnected from I/O module 106.

Relay R2 functions in a similar fashion using its normally open contacts 112 and normally closed contacts 114 to connect a mold cavity pressure transducer to I/O module 106 through conditioning module 104 when relay R2 is de-energized. When energized, relay R2 connects one input 116 from cavity pressure signal conditioning module 104 and one input 118 from nozzle melt pressure signal conditioning module 102 to I/O module 106. This effectively supplies a signal representing the difference between the nozzle melt pressure and the mold cavity pressure to I/O module 106. The "delta" box 119 illustrates the difference which becomes the core variable. For proper operation, modules 102 and 104 should be adjusted to provide compatible voltage level signals scaled to their respective measured pressures. Controller 40 then implements a PID control loop using this pressure difference signal as described with reference to FIG. 7. The PID control loop produces a signal on output 120 of I/O module 106 which is used to control a hydraulic system to control injection pressure.

Referring to FIGS. 9a and 9b, an operator interface for one embodiment of the present invention is illustrated. This operator interface allows the operator to enter various control parameters and monitor process variables during the injection process. The interface includes an area for labeling the particular parameter or variable, indicated generally by reference numeral 130, in addition to areas for entering values 132 or ranges 136,138 of control parameters and for displaying actual values 134 with corresponding units 140. Entering a value in area 132, in effect, implements one of the many alternative control strategies illustrated in FIG. 7. As such, the building blocks, i.e. the control parameters and control variables, of an open architecture control system are easily restructured to adapt the control system to particular applications, products, or materials.

While the best modes for practicing the invention have been described in detail, those familiar with the art to which this invention relates will recognize various alternative designs and embodiments for practicing the invention as defined by the following claims.

What is claimed is:

1. A method of injection molding for use with an injection molding machine including a mold with a cavity formed therein for receiving molten plastic and a hydraulic unit for creating an injection pressure to fill the mold cavity with molten plastic at a predetermined melt pressure, comprising:

supplying air to the cavity at a predetermined air pressure;

sensing the melt pressure during injection;

sensing the air pressure in the cavity during injection; and providing a closed loop controller to monitor the sensed melt pressure and sensed air pressure and to produce signals to be sent to the hydraulic unit for maintaining the melt pressure at desired levels.

2. A method for injection molding of a shot of plastic in an injection molding machine having a mold defining a cavity, the method comprising:

determining a stress to be experienced by the shot of plastic during molding in the injection molding machine;

pressurizing the shot of plastic to a melt pressure substantially equal to a first melt pressure value as the plastic is plasticized, the first melt pressure value being determined based on the determined stress;

pressurizing the cavity to a cavity pressure substantially equal to the first melt pressure value;

increasing the melt pressure of the shot of plastic to a second melt pressure value to inject the shot into the cavity; and maintaining a substantially constant difference between the cavity pressure and the melt pressure for a predetermined period of time during which the shot of plastic is injected into the cavity.

3. The method of claim 2 wherein said maintaining comprises:

sensing the melt pressure and the cavity pressure and generating feedback signals indicative thereof; and generating signals for controlling at least one of the melt pressure and the cavity pressure.

4. The method of claim 3 wherein said generating comprises:

comparing the substantially constant difference to a predetermined reference value to determine an error value; and modifying the melt pressure to reduce the error value.

5. The method of claim 4 wherein said modifying comprises controlling hydraulic pressure applied to a hydraulic cylinder.

6. The method of claim 3 wherein said generating comprises:

comparing the substantially constant difference to a predetermined reference value to determine an error value; and modifying the cavity pressure to reduce the error value.

7. The method of claim 6 wherein said modifying comprises controlling a supply of pressurized air to the cavity.

8. The method of claim 7 wherein said controlling comprises actuating a valve to selectively couple the supply to the cavity.

9. The method of claim 6 wherein said modifying comprises controlling air egress from the cavity.

10. The method of claim 3 wherein said generating comprises:

comparing the substantially constant difference to a predetermined reference value to determine an error value; and modifying at least one of the cavity pressure and the melt pressure to reduce the error value.

11. The method of claim 10 wherein said modifying comprises modifying at least one of the cavity pressure and the melt pressure based on change of the error value with respect to time.

12. The method of claim 2 wherein said maintaining comprises:

sensing the melt pressure and the cavity pressure and generating feedback signals indicative thereof;

combining the feedback signals to generate a difference signal; and applying proportional-integral-differential control to the difference signal to modify at least one of the melt pressure and the cavity pressure.

13. The method of claim 2, wherein said determining a stress comprises:

calculating a maximum uniform load to be experienced by a shot of plastic in accordance with the following formula:

$$q = \frac{yEh^3 \left[ 1 + 1.05 \left( \frac{a}{b} \right)^5 \right]}{ka^4}$$

where q is a uniform load per unit area, a is width of the cavity, b is thickness of the cavity, h is height of the cavity, E is apparent modulus of elasticity of the plastic, k is a variable based upon heat deflection temperature of the plastic, and y is a shrinkage factor of the plastic;

calculating a maximum mechanical stress to be experienced by a shot of plastic in accordance with the following formula:

$$S(\text{mechanical}) = \frac{qa^2}{2h^2 \left[ 1 + .0623 \left( \frac{a}{b} \right)^6 \right]}$$

where S(mechanical) is a maximum mechanical stress to be experienced by the part, and q is the uniform load per unit area, a is width of the cavity, b is thickness of the cavity, h is height of the cavity;

calculating a maximum thermal stress to be experienced by a shot of plastic in accordance with the following formula:

$$S(\text{thermal}) = dT * L * E$$

where S(thermal) is a maximum thermal stress to be experienced by the part, dT is a change in temperature of the plastic between room temperature and the temperature at which the plastic is in a plastic range of deformation, L is a thermal coefficient, E is a modulus of elasticity; and determining the stress to be experienced by a shot of plastic to be equal to the greater value of S(mechanical) and S(thermal).

14. A method of injection molding for use with an injection molding machine including a mold with a cavity formed therein for receiving molten plastic having a measurable melt pressure, comprising:

supplying air to the cavity at a predetermined air pressure;

commencing injection of the molten plastic into the mold cavity;

sensing the melt pressure during injection;

sensing the air pressure in the cavity during injection;

establishing a core variable indicative of the difference between the sensed melt pressure and sensed air pressure; and maintaining the core variable at desired levels during injection, whereby to maintain a substantial static pressure in the molten plastic as it enters and fills the mold cavity.

15. The method of claim 14, wherein said machine further comprises a hydraulic unit for generating injection pressure for injecting the molten plastic into the mold cavity, said hydraulic unit including a hydraulic valve, the method further comprising:

providing a closed loop controller for using selected machine operating parameters to adjust the core variable in real time to establish a current variable; and adjusting the current variable to create a signal to be sent to the hydraulic valve for adjusting the injection pressure in order to maintain the static pressure at desired levels during injection.

\* \* \* \* \*